(12) United States Patent
Smithwick

(10) Patent No.: US 11,503,274 B2
(45) Date of Patent: Nov. 15, 2022

(54) HIGH SPEED BINARY COMPRESSIVE LIGHT FIELD PROJECTION SYSTEM

(71) Applicant: Disney Enterprises, Inc., Burbank, CA (US)

(72) Inventor: Quinn Yorklun Jen Smithwick, Pasadena, CA (US)

(73) Assignee: Disney Enterprises, Inc., Burbank, CA (US)

(*) Notice: Subject to any disclaimer, the term of this patent is extended or adjusted under 35 U.S.C. 154(b) by 361 days.

(21) Appl. No.: 16/402,007

(22) Filed: May 2, 2019

(65) Prior Publication Data
US 2020/0351490 A1    Nov. 5, 2020

(51) Int. Cl.
| | |
|---|---|
| *H04N 13/351* | (2018.01) |
| *H04N 13/365* | (2018.01) |
| *H04N 13/302* | (2018.01) |
| *H04N 13/133* | (2018.01) |
| *H04N 13/363* | (2018.01) |

(Continued)

(52) U.S. Cl.
CPC ......... *H04N 13/351* (2018.05); *G02B 5/0215* (2013.01); *G02B 5/0252* (2013.01); *G03B 21/008* (2013.01); *G03B 21/2053* (2013.01); *G03B 21/625* (2013.01); *G03B 35/22* (2013.01); *H04N 9/312* (2013.01); *H04N 9/3105* (2013.01); *H04N 13/133* (2018.05); *H04N 13/302* (2018.05); *H04N 13/363* (2018.05);

(Continued)

(58) Field of Classification Search
CPC .............. H04N 9/31–3197; H04N 13/00–398; G02B 27/01–0189; G03B 21/00–64
See application file for complete search history.

(56) References Cited

U.S. PATENT DOCUMENTS

| | | |
|---|---|---|
| 9,405,124 B2 | 8/2016 | Hirsch et al. |
| 2009/0225234 A1 | 9/2009 | Ward et al. |

(Continued)

FOREIGN PATENT DOCUMENTS

| | | |
|---|---|---|
| CN | 1285928 A | 2/2001 |
| CN | 101080667 A | 11/2007 |

(Continued)

OTHER PUBLICATIONS

Extended European Search Report for Application No. 20166079.2-1020 dated Aug. 26, 2020.

(Continued)

*Primary Examiner* — Christopher A Lamb, II
(74) *Attorney, Agent, or Firm* — Patterson + Sheridan, LLP

(57) ABSTRACT

Implementations of a compressive light field projection system are disclosed herein. In one embodiment, the compressive light field projection system utilizes a pair of light modulators, such as digital micromirror devices (DMDs), that interact to produce a light field. The light field is then projected via a projection lens onto a screen, which may be an angle expanding projection screen that includes a Fresnel lens for straightening the views of the light field and either a double lenticular array of Keplerian lens pairs or a single lenticular, for increasing the field of view. In addition, compression techniques are disclosed for generating patterns to place on the pair of light modulators so as to reduce the number of frames needed to recreate a light field.

20 Claims, 14 Drawing Sheets

(51) Int. Cl.
    *H04N 13/398*  (2018.01)
    *G02B 5/02*    (2006.01)
    *G03B 21/00*   (2006.01)
    *G03B 21/20*   (2006.01)
    *G03B 21/625*  (2014.01)
    *G03B 35/22*   (2021.01)
    *H04N 9/31*    (2006.01)
    *H04N 13/346*  (2018.01)

(52) U.S. Cl.
    CPC ......... *H04N 13/365* (2018.05); *H04N 13/398* (2018.05); *H04N 13/346* (2018.05)

(56) References Cited

U.S. PATENT DOCUMENTS

| | | | | |
|---|---|---|---|---|
| 2012/0044467 A1* | 2/2012 | Nakayama | ............ | G03B 21/20 353/85 |
| 2014/0293247 A1* | 10/2014 | Abe | ............ | H04N 9/317 353/101 |
| 2015/0124175 A1* | 5/2015 | Perkins | ............ | G03B 21/208 348/759 |
| 2015/0124227 A1* | 5/2015 | Kobayashi | ............ | H04N 9/3161 353/38 |
| 2015/0124337 A1* | 5/2015 | Ito | ............ | G02B 27/0012 359/733 |
| 2016/0091784 A1* | 3/2016 | Hu | ............ | G03B 21/2013 353/102 |
| 2016/0286178 A1* | 9/2016 | Shields | ............ | G03B 21/208 |

FOREIGN PATENT DOCUMENTS

| | | |
|---|---|---|
| CN | 103559865 A | 2/2014 |
| CN | 108449587 A | 8/2018 |
| WO | 2019040484 A1 | 2/2019 |

OTHER PUBLICATIONS

European Extended Search Report for Application No. 20166079.2-1020/3734971 dated Dec. 2, 2020.

Chinese Office Action for Application No. 202010358918.9 dated May 26, 2021.

National Intellectual Property Administration, PRC, The Second Office Action for Chinese Application 202010358918.9 dated Nov. 29, 2021.

\* cited by examiner

A

B

A

B

A

B

A

B

C

HIGH SPEED BINARY COMPRESSIVE LIGHT FIELD PROJECTION SYSTEM

BACKGROUND

Field

The present disclosure relates generally to light field projection, and more specifically to a compressive light field projection system.

Description of the Related Art

Many use cases exist for displays that allow viewers to freely view three-dimensional (3D) scenes without the need to wear 3D glasses. However, traditional light field projection techniques for creating 3D scenes, such as techniques that rely on liquid crystal display (LCD) devices, suffer from severe limitations, including the inability to scale to large sizes or fields of view, low frame rates, dimness, limited numbers of views, and limited depths.

SUMMARY

One embodiment of this disclosure provides a light field projector. The light field projector generally includes a light source configured to emit light. The light field projector further includes an optical arrangement comprising: a first light modulator, the first light modulator being controlled to reflect light incident on the first light modulator based, at least in part, on a first pattern, and a second light modulator, the second light modulator being controlled to reflect light that has been reflected by the first light modulator and is incident on the second light modulator based, at least in part, on a second pattern.

Another embodiment of this disclosure provides a computer-implemented method for generating a light field. The method generally includes receiving data indicating the light field to be generated. The method further includes determining at least one respective pattern for each of a pair of light modulators that interact to produce the light field. In addition, the method includes controlling each light modulator of the pair of light modulators based, at least in part, on the at least one respective pattern determined for the light modulator.

Another embodiment of this disclosure provides an angle-expanding projection screen. The angle-expanding projection screen generally includes a Fresnel field lens configured to straighten views of a light field projected thereon. The angle-expanding projection screen further includes at least one lenticular configured to increase a field of view of the light field having the straightened views.

Other embodiments include, without limitation, a computer-readable medium that includes instructions that enable a processing unit to implement one or more embodiments of the disclosed method, as well as a system configured to implement one or more aspects of the disclosed method.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Various implementations for a compressive light field projection system are disclosed herein. In one embodiment, the compressive light field projection system utilizes a pair of light modulators, such as digital micromirror devices (DMDs), that interact to produce a light field. The light field is then projected via a projection lens onto a screen, which in embodiments may be an angle expanding projection screen that includes a Fresnel lens for straightening the views of the light field and either a double lenticular array of Keplerian lens pairs or a single lenticular, for increasing the field of view. In addition, compression techniques are disclosed for generating patterns to place on the pair of light modulators so as to reduce the number of frames needed to recreate a light field.

Figure 1:
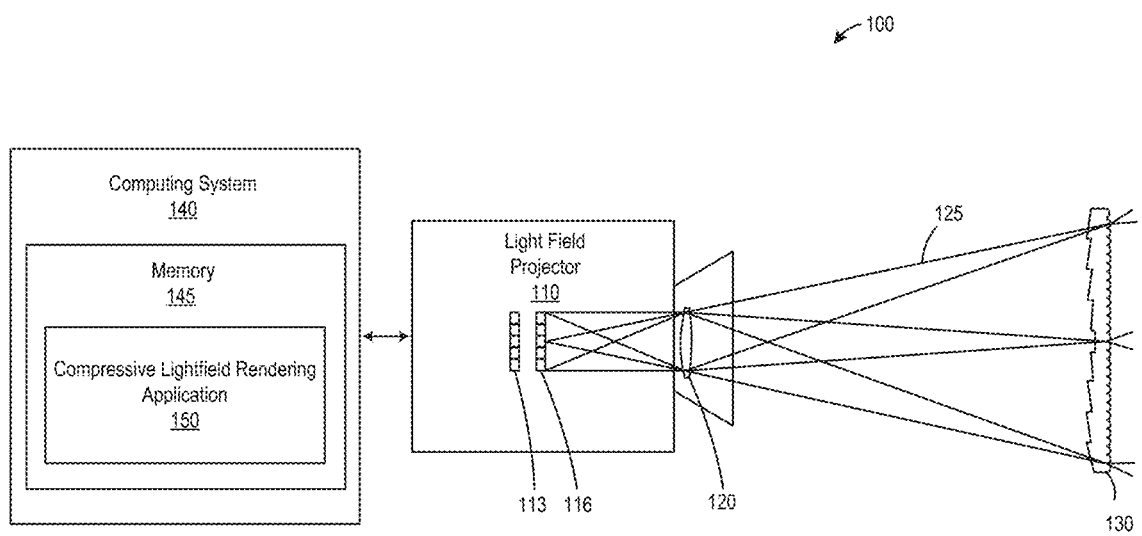
FIG. 1 illustrates a light field generation system, according to an embodiment.

FIG. 1 illustrates a light field generation system 100, according to an embodiment. As shown, the light field generation system 100 includes a light field projector 110, an angle-expanding screen 130, and a computing system 140 configured to execute a compressive light field rendering application 150 stored in memory 145. Illustratively, the light field projector 110 includes a pair of light modulators 113 and 116 that interact with each other and can be used to generate a light field 125, which may represent relatively high-resolution and dense multi-view imagery. The light field projector 110 further includes a projection lens 120 that projects the generated light field onto the angle-expanding screen 130, which straightens the views of the projected light field and increases the field of view (thereby increasing the parallax of the projected imagery). For example, the light field 125 may be a 1" square that is projected onto the angle-expanding screen 130 to enlarge its size to 175-200" diagonal.

In operation, the compressive light field rendering application 150 determines patterns to place on each of the light modulators 113 and 116 in order to generate a light field, while reducing the number of frames (patterns) needed to produce the light field. To determine the patterns to place on the light modulators 113 and 116, the compressive light field rendering application 150 may, in one embodiment, perform binary non-negative matrix factorization after splitting a desired light field into different brightness levels. Experience has shown that doing so can produce a one to two order of magnitude reduction in bandwidth (i.e., frames needed). In alternative embodiments, the compressive light field rendering application 150 may perform a nonlinear dynamic programming search, a gradient descent with binary thresholds, or a genetic algorithm to determine the patterns to place on the light modulators 113 and 116.

Figure 2A:
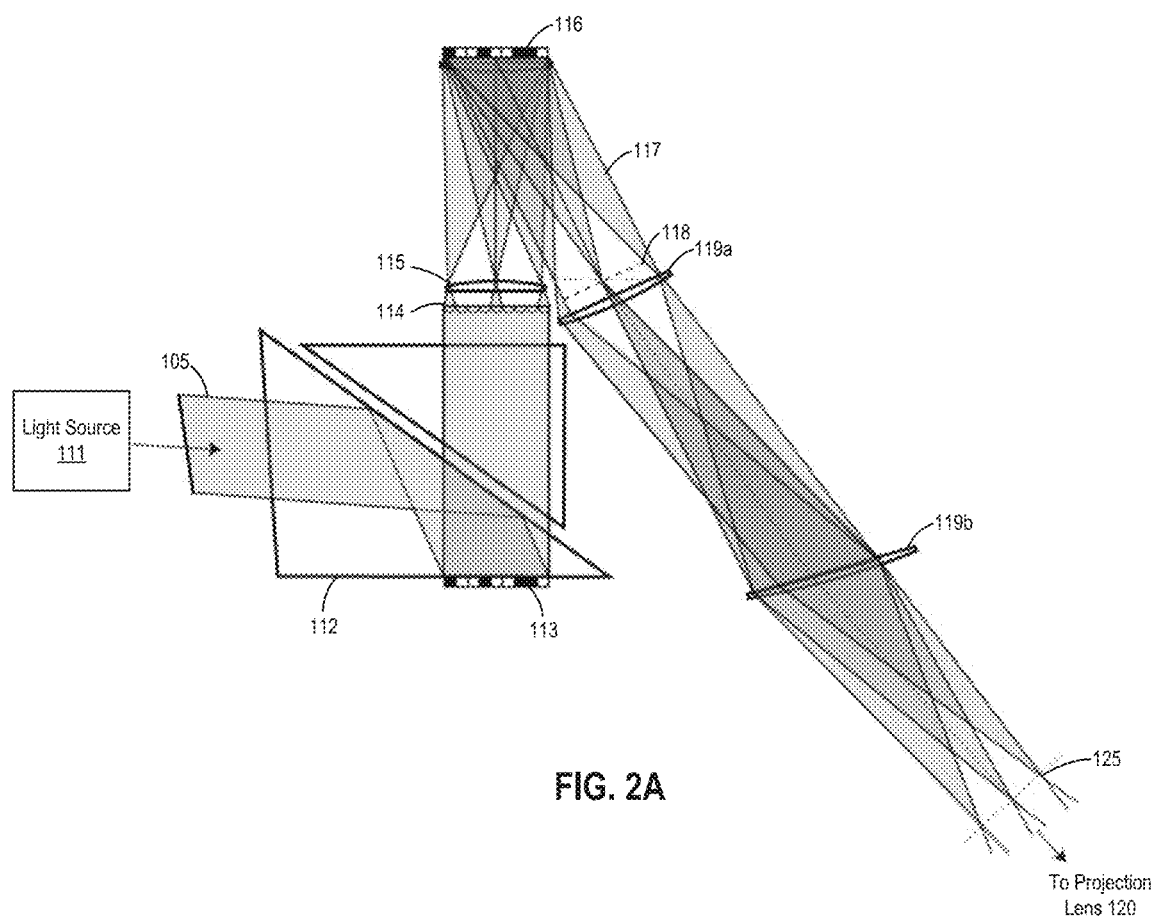
FIG. 2A illustrates components of a light field projector, according to an embodiment.

FIG. 2A illustrates components of the light field projector 110 in greater detail, according to an embodiment. Although examples of specific optical elements are disclosed, it should be noted that any suitable optical elements having the properties described herein may be used, and the optical elements discussed may further be manufactured from any suitable materials in any feasible manner. In addition, the features described with respect to a particular implementation may be beneficially applied to other implementations without requiring an explicit recitation.

As shown, the light field projector 110 includes a light source 111, a total internal reflecting (TIR) prism 112, dual light modulators 113 and 116, a diffuser (e.g., a microlens array 114), and a modified shift tilt assembly formed by lenses 119A and 119B. The dual light modulators 113 and 116 are coupled together and may be used to produce a light field that provides high resolution, dense multiview imagery. In one embodiment, light from each pixel in a row of the modulator 113 interacts with each pixel in a corresponding row of the modulator 116, in order to control the intensity of light in a set of viewing directions. The more views that are controlled in such a manner, the greater the depth a recreated image can have.

In operation, the light source 111 emits a beam of light 105. The beam of light 105 can be a multiband RGB for color that is either color sequential (one set of dual modulators) or uses three sets off dual modulators—one for each color component. In one embodiment, the light beam 105 is a collimated laser light. Such a collimated laser light must illuminate the light modulator 113 off-axis for patterned light to be reflected on-axis by the light modulator 113. As shown, the light beam 105 emitted by the light source 111 is reflected by the TIR prism 112 and incident on the light modulator 113 at an angle, shown as 24°. In an alternative embodiment, the light source 111 may itself be angled to emit a light beam at an angle toward the light modulator 113. This beam is also can have an angle of 24° (or 20° for older DMDs), but this angle depends upon what the tilt angle of the DMD mirror is for the on and off-state. It is often desired to come in at the correct angle (i.e., 24°) so after being reflect, the beam leaves at 0° (although this is not a requirement). Although a TIR prism is not required in this case, the TIR prims makes it easier and more compact to have the light come in at the right angle of incidence for 0° reflection.

Illustratively, a portion of light from the light beam 105 is reflected off the light modulator 113 toward the light modulator 116 at a 0° angle (vertical axis in FIG. 2A). Mirrors of the light modulator 113 may be controlled to reflect a pattern that encodes an image onto the light beam, and the light modulators 113 and 116 are also optically cross-coupled by the light traveling between them in order to generate a light field. The optical cross-coupling and interaction between the two modulators allows the control of the radiance of light rays for each position and angle of the projection (i.e. a light field), thus providing the capability to produce an autostereoscopic projection with multiple views of a 3D scene.

Multiple sets of patterns, determined by the compressive light field application 150 executing in the computing system 140, may be presented in a temporal sequence on the light modulators 113 and 116, with the presentation of such patterns additively combining to produce a full light field.

Figure 3:
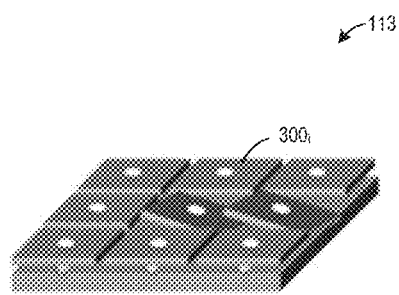
FIG. 3 illustrates a portion of an example digital micromirror device, according to an embodiment.

In one embodiment, each of the light modulators 113 and 116 may be a digital micromirror device (DMD). Although the light modulators 113 and 116 are also referred to herein as DMDs 113 and 116, other types of light modulators may be used in lieu of DMDs in some embodiments. Using high speed modulators such as DMDs, long sequences of patterns can be presented during each frame refresh time to create relatively complex light fields. For example, DMDs do not require polarization, unlike liquid crystal display (LCD) or liquid crystal on silicone (LCOS) panels that are used to generate light fields. As a result, some DMDs can run up to 32,000 frames per second, which is more frames per second than LCDs can typically achieve, even if multiplexing for color and intensity is required. FIG. 3 illustrates a portion of an example DMD 300 that may be used as one of the light modulators 113 or 116. As shown, the DMD 300 includes a rectangular array of switchable mirrors $310_i$, each of which can be controlled (by, e.g., the compressive light field rendering application 150 running in the computing system 140) to reflect light that is incident thereon toward a desired angle, also referred to as turning the mirror "on," or dump the light that is incident thereon (e.g., by reflecting the light at another angle where, e.g., a viewer cannot see the light) also referred to as turning the mirror "off." That is, each of the mirrors $310_i$ can produce a binary output of light being on, if the incident light is reflected by the mirror, or off, if the incident light is dumped. It should be understood that, as DMDs are reflective, DMDs cannot be stacked in-line like transmissive LCD panels.

Returning to FIG. 2A and assuming that the light modulators 113 and 116 are DMDs, a configuration of the DMDs 113 and 116 is shown that couples the DMDs 113 and 116 without stacking them, which as described is not feasible. As shown, each mirror in the DMD 113 may be controlled to deflect light incident thereon toward the DMD 116, or dump the light incident thereon such that the light does not reach the DMD 116. Similarly, each mirror in the DMD 116 may be controlled to deflect light incident thereon toward the shift tilt assembly or dump the light such that the light does not reach the shift tilt assembly. In one embodiment, mirrors in the DMD 113 are controllable (by, e.g., the computing system 140 executing the compressive light field rendering application 150) to encode the light beam 105 incident thereon with position information, and mirrors in the DMD 113 are controllable to encode the light beam incident thereon (which may be a portion of the original light beam 105) with angle information, such that light rays of the output light field are only viewable from certain positions and angles. In such a case, one DMD plane, shown as the DMD 113, controls pixel positions, while another DMD plane, shown as the DMD 116, controls the views seen from each of those pixel positions. The number of display pixels and views may be equal to the number of DMD pixels in each plane, permitting the creation of high resolution 3D images with a relatively large number of views (and depth). However, DMD modulators can only be used to present binary imagery, so generating intensity variations and different colors requires varying the intensity and wavelength of the light source 111. The wavelength of the light source 111 that emits white light can be varied using filters. In another embodiment, multiple lasers can be used, each with a different color (different wavelengths) and beam-combining them into a single fiber. Also typically the light from a fiber has a Gaussian intensity profile, but it may be desirably to have illumination. A square core fiber can be used which produces an even flat-top beam profile.

In one embodiment, the light reflected (as opposed to dumped) from each mirror in a row of the DMD 113 interacts with every mirror in a corresponding row of the DMD 116. An interaction may include the (reflected) light also reflecting off one of the mirrors in the corresponding row of the DMD 116, in which case a viewer would be able to see the reflected light from an associated direction, or the (reflected) light being dumped by such a mirror, in which case a viewer would be unable to see light from the associated direction. In one embodiment, such interactions are used to produce a light field having horizontal-only parallax (i.e., not having vertical parallax), in which views change when a viewer moves from side to side but not up and down. Horizontal-only parallax takes advantage of the fact that viewers typically move from side to side rather than bobbing up and down, and that human eyes are spaced horizontally apart to enable binocular (3D) vision. Further, horizontal-only parallax decreases the information required by a square root of the resolution to compute or produce the light field. The information related to this computation is the intensity for each direction and position. The information related to produce the light field is the number of pixels in the modulators and the number of temporally multiplexed images.

Horizontal-only parallax is enabled by the use of a collimated laser light as the light beam 105, DMDs 113 and 116 in a facing relationship, a diffuser that is a cylindrical microlens array 114, and a field lens 115 between the DMDs 113 and 116. The microlens array 114 in particular acts as a horizontal diffuser that focuses light incident thereon into points, with the light then spreading out from those points. As light from the microlens array 114 spreads out symmetrically, the field lens 115 is used to deflect light from the sides inward to aim at the DMD 116. Illustratively, the field lens 115 does not deflect light produced by the middle of the microlens array 114, but does deflect light produced by the sides of the microlens array 114.

By using the microlens array 114 in conjunction with the field lens 115, light reflected (as opposed to dumped) by the mirrors in each row of the DMD 113 is diffused out to interact with every mirror in a corresponding row of the DMD 116. That is, the reflected light from each pixel in a row of the first DMD 113 passes through the matched lenticular microlens array 114 and the field lens 115 to be horizontally diffused and distributed to every pixel in a corresponding row of the second DMD 116. The interaction of light reflected by mirrors in a row of the DMD 113, encoding position information (i.e., the positions of pixels corresponding to the mirrors), with every mirror in the corresponding row of the DMD 116, which encode angle information (i.e., the angles that pixels can be seen from), permits both position and angle information to be encoded in order to produce a light field with horizontal parallax.

In one embodiment, the microlens array 114 that focuses light incident thereon into points is a lenticular lens (i.e., an array of lenses) including a series of cylindrical lenses. In such a case, each of the cylindrical lenses may be approximately the same size as a pixel generated by one of the mirrors of the DMD 113. Use of the microlens array 114 with cylindrical lenses, as opposed to some other types of horizontal diffusers, permits pixels in each row of the DMD 113 to interact only with the pixels in a corresponding row of the DMD 116. In a particular embodiment, each cylindrical lens may be approximately 10.5 microns in pitch (i.e., the spacing between lens centers, which may also be considered the chord of the cylindrical lens) to match the modulator pitch. The microlens array 114 may be produced photolithographically, or in any other feasible manner. In an alternative embodiment, a holographic one-dimensional (1D) diffuser that only diffuses light horizontally but not vertically may be used in lieu of the microlens array 114. However, a microlens array is typically more precise than a holographic 1D diffuser, and a microlens array produces point sources that can be beneficial for a screen, discussed in greater detail below.

As shown, light is reflected by mirrors in the DMD 116 (that are not controlled to dump light incident thereon) at an angle (e.g., 24 degrees), producing the output light field 117. Although light illuminates the DMD 116 (and a co-located field lens) face-on, columns of points are reimaged by the DMD 116 off-axis so the view angles of the reflections off the DMD 116 mirrors are consistent across the device. However, as the DMD 116 is made of an array of individual mirrors in a plane, light incident thereon and reflected off-axis includes focal points that are along a plane, shown as the ghosted line 118, that is skewed in depth, rather than being perpendicular to the optical axis. That is, the focal plane of the view reimaged by the DMD 116 and intensity modulated point columns are skewed in depth. It should be understood that the skewed light field beam 117 may not interact as desired with a projection lens that projects the light field onto a screen for viewing, as the projected light field would not focus on a vertical screen. In one embodiment, a shift-tilt lens assembly, shown as including lenses 119a and 119b, is used to reimage the skewed depth plane and point columns (which are on the skewed depth plane) onto a flat focal plane with properly oriented views. That is, the lenses 119a and 119b are arranged at appropriate angles (which may generally depend on the angle at which light is reflected by the mirrors in the DMD 116) to deflect light passing through the lenses 119a and 119b so that the output light field 125 is perpendicular to an optical axis, as standard projection lenses expect.

Although not shown in FIG. 2A, a vertical diffuser attached to the projection screen, such as a holographic 1D diffuser or horizontal lenticulars which diffuse light out vertically, may also be used. Such a vertical diffuser may permit a viewer to see an image coming from the screen plane and having multiple views.

Figure 2B:
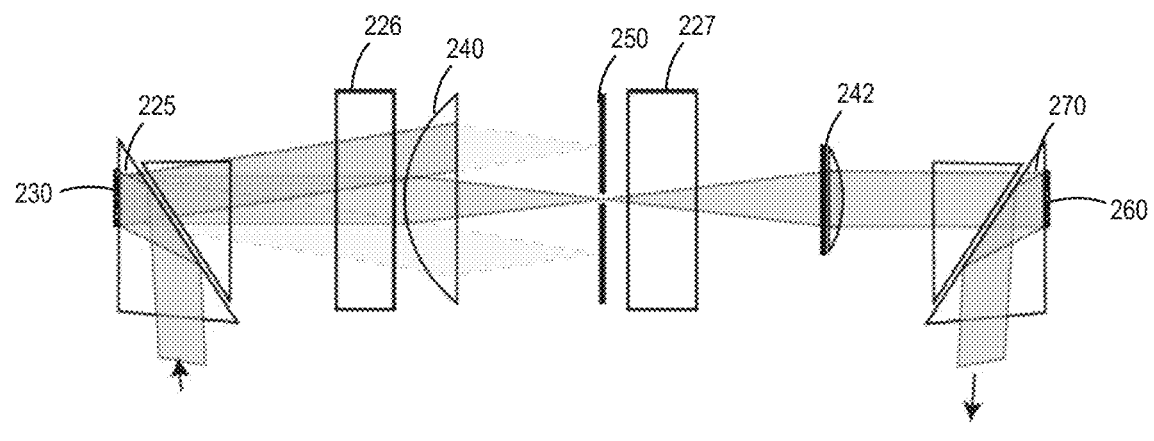
FIG. 2B illustrates components of a light field projector, according to an alternative embodiment.

FIG. 2B illustrates components of a light field projector, according to an alternative embodiment. This embodiment is a "relayed DMD" light field projector allowing use of high power fiber-coupled laser illumination. The design of FIG. 2A relies on collimated light to illuminate the modulators, pick up binary patterns, and to form the point source array (using the micro-lens array) which interacts with the single lenticular screen to increase the field of view. However, doing so necessitates the use of highly collimated laser beams. In particular, to produce bright images on very large screens, high lumen projectors are required (and higher power illuminators). For example, to achieve high power modulatable laser illumination, multiple diode lasers that are combined into a single multi-mode fiber may be used. However, the multimode fiber has a large core diameter and, as a result, the laser beam cannot be tightly collimated. Using laser light from a multimode fiber in the light field projection setup may thus result in light from one modulator row expanding and interacting with multiple rows of the other modulator. Furthermore, the finite fiber core size may result in extended sources instead of point sources after the microlens array, defeating the operation of the single lenticular as a beam-expander.

The "relayed DMD" light field projector allows use of the higher power from multiple fiber-coupled laser diodes with a large multimode fiber. In order to achieve this, it is required that rows of a first modulator be vertically reimaged onto corresponding rows of a second modulator by adding relay optics into the light field projector system. However, horizontally, the pixel columns of the first modulator must be reimaged onto the corresponding lenslets of the microlenslet diffuser, so that each pixel of the first modulator is cross-coupled with every pixel in the corresponding row of the second modulator. Doing so requires cylindrical lenses, permitting each axis may be relayed to different locations.

As shown in Panel A, vertically cylindrical lens 240 and spherical lens 242 relay rows of DMD 230 to rows of DMD 260, while a slit-aperture 250 blocks unwanted DMD diffraction orders. This allows use of light that is from fiber illuminator and beam-expander, which enters a TIR-Prism 225 and reflects off of (or does not reflect off of) DMD 230 and ultimately reflects off of (or does not reflect off of) DMD 260 and leaves to tilt-shift optics with slit-aperture and projection lens via a TIR-prism 270. Also shown are cylindrical transform relay lenses 226 and 227 that horizontally image the DMD 230 onto cylindrical lenslet array (CLA) 242, as well as a cylindrical transform lens 240 as part of a relay lens pair (240 and 242) that vertically images DMD 230 to DMD 260. As shown in Panel B, the horizontally cylindrical relay optics 226 and 227 relay columns of DMD 230 to columns of cylindrical CLA 242 and spherical lens 242 (e.g., a field lens) directs the resulting horizontally diffused light to TIR Prism 270 and DMD 260, such that the reflected light from each pixel in a row of the first DMD 230 is distributed to every pixel in a corresponding row of the second DMD 260.

The horizontal relay (as well as the tilt-shift assembly) also provides the opportunity to remove ghost images of the modulators caused by diffraction from the modulators' micro-mirrors. At the focus of the relay, a spatial filter may be placed in one embodiment, such that only the desired on-axis light passes through, but the off-axis diffracted light from the micro-mirror array is removed.

Figure 4:
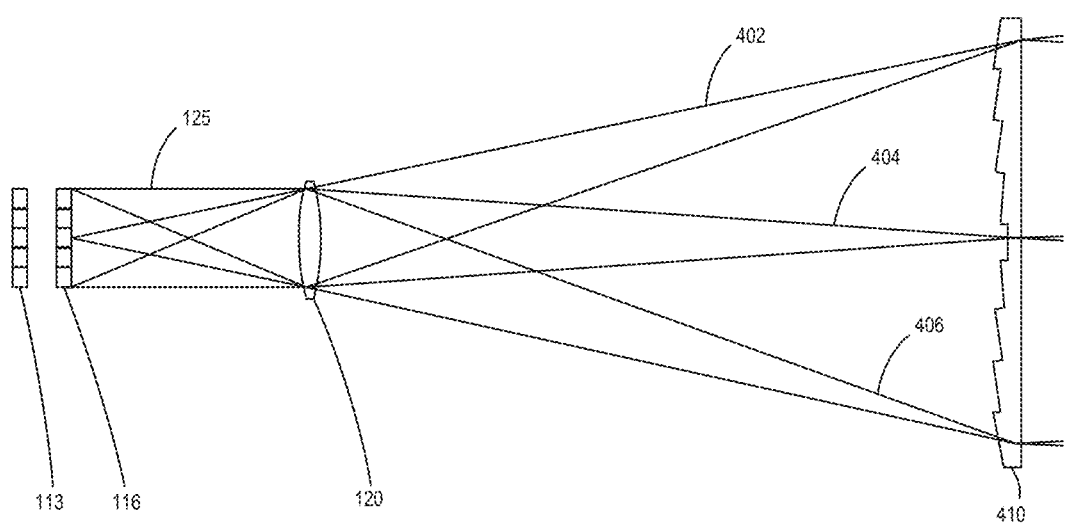
FIG. 4 illustrates a projection screen, according to an embodiment.

FIG. 4 illustrates a projection screen 410, according to an embodiment. As shown, the projection screen 410 is a Fresnel field lens that acts to straighten the views (e.g., the views 402, 404, and 406) of the light field 125 output by the light field projector 110 after the light field 125 is enlarged by the projection lens 120, and a vertical diffuser (not shown) for horizontal parallax only displays. The projection lens 120 is configured to project the light field 125 generated by the light field projector 110 against the projection screen 410, which may be, e.g., mounted on a wall such that viewers on the other side of the wall can freely view relatively large, deep, and high-resolution 3D scenes represented by the projected light field without wearing 3D glasses. An alternative embodiment may instead employ front projection by, e.g., projecting the light field 125 toward a mirrored Fresnel on a wall rather than a projection screen. Assuming the light field 125 is being projected onto the projection screen 410, the projection lens 120 may be used to focus a small modulator or light field plane that is illuminated or created inside the projector 110 onto the screen 410, such that the image size on the screen 410 is much larger than the original image size and the image is in focus on substantially all parts of the screen 410. As described, the light field 125 may be, e.g., a 1" square and projected onto a screen to enlarge its size to 200" diagonal. The projection lens 120 should be of high enough quality so that the image can be magnified.

In operation, the light field 125 produced by the light field projector 110, which is represented for simplicity as the two DMDs 113 and 116 in FIG. 4, is passed through the projection lens 120, which as described enlarges the light field 125 spatially. However, due to the "optical invariant," which requires that the product of the angle and field of view of light rays be a constant throughout space, the field of view of the light field 125 is proportionally reduced when the light field 125 is enlarged by the projection lens 120. Such a reduced field of view reduces the angles that viewers can see the 3D scene by looking or moving around. In addition, the view zones are skewed (or biased) rather than facing forward, as the direction of light projected by the projection lens 120 is splayed outwards. As used herein, skewed, biased, and splayed refer to the field of view (or the directions of light rays) not being symmetric about the optical axis of the lens/screen. In the illustrated embodiment, the Fresnel field lens projection screen 410 straightens the skewed views so that viewers can view the light field by standing directly in front of the projection screen 410, as opposed to at an angle.

Figure 5:
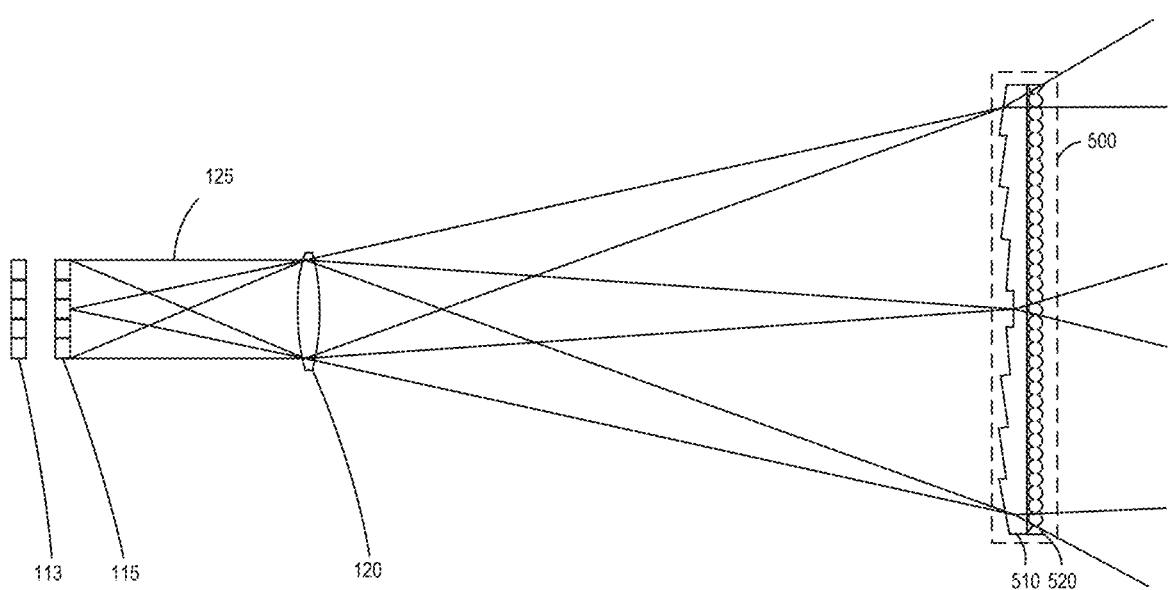
FIG. 5 illustrates an angle-expanding projection screen, according to an embodiment.
Figure 6:
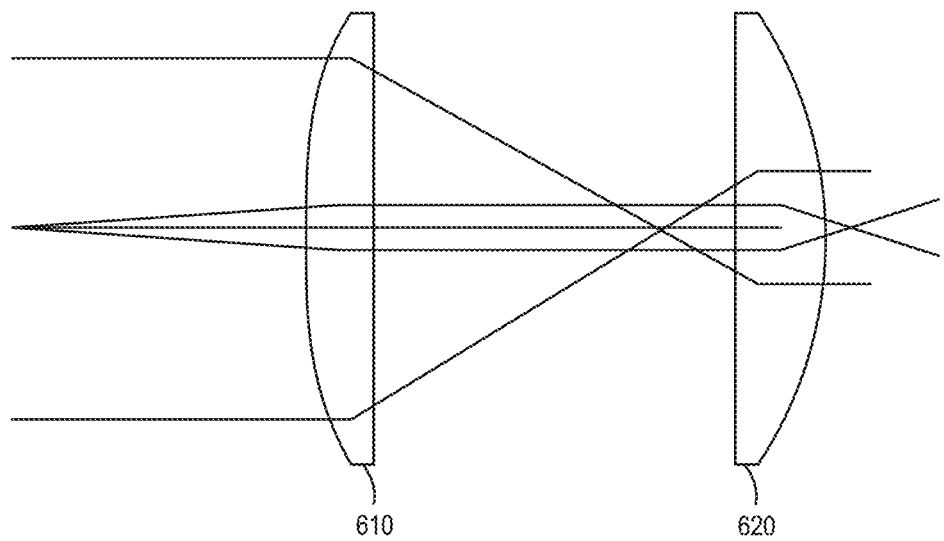
FIG. 6 illustrates in greater detail a Keplerian lens pair in the angle-expanding screen of FIG. 5, according to an embodiment.
Figure 6:
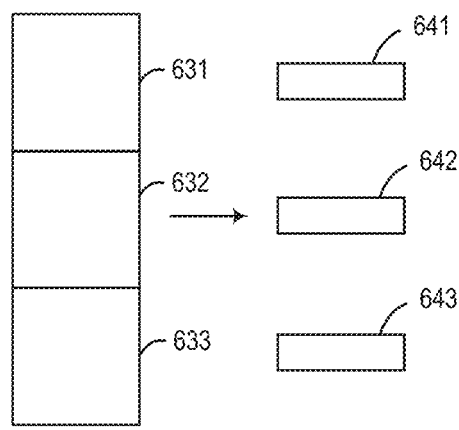

FIG. 5 illustrates an angle-expanding projection screen 500, according to an embodiment. As shown, the angle-expanding projection screen 500 includes a Fresnel field lens 510 and a double lenticular 520, which is a double fly-eye array of lenses, each of which may also be referred to as a "lenslet." Similar to the Fresnel field lens 410 discussed above with respect to FIG. 4, the Fresnel field lens 510 is configured to straighten skewed views produced by the projection lens 120. In one embodiment, the double lenticular 520 includes an array of Keplerian lens pairs, with each Keplerian lens pair acting to shrink a respective pixel size and increase a field of view of that pixel, by focusing the pixel's ray bundle to create a larger field of view while maintaining its location. FIG. 6 illustrates in greater detail an example pair of Keplerian lenses 610 and 620 in the double lenticular 520 of the angle-expanding projection screen 500, according to an embodiment. As shown in panel A, the Keplerian lens pair 610 and 620 operates to decrease an image pixel size (area) when light for the pixel passes through the Keplerian lens pair 610 and 620 (from left to right in FIG. 6). Illustratively, the pair of Keplerian lenses 610 and 620 are curved back-to-back lenses, with collimated parallel light that enters the lens 610 being focused between the lenses 610 and 620 at a point that is closer to the lens 620, expanded out again, and deflected by the lens 620 to become a collimated parallel light beam that is less thick than the collimated parallel light beam that originally entered the lens 610. At the same time that the Keplerian lens pair 610 and 620 decreases the size of the pixel, the Keplerian lens pair 610 and 620 creates a larger field of view. This is a result of the optical invariant, which requires a decrease in size to be associated with an increased field of view in order for the product of the size and field of view to remain constant. Panel B shows an example of input pixels 630, 631, and 632 being shrunk to output pixels 641, 642, and 643 by an array of Keplerian lens pairs (e.g., the Keplerian lens pair 610 and 620). As shown, the relative spacing between the input pixels 630, 631, and 632 is maintained in the output pixels 641, 642, and 643, with the input pixels 630, 631, and 632 being shrunk in height but maintaining their widths.

Returning to FIG. 5, the combination of the projection lens 120 with the angle-expanding projection screen 500 that includes the Fresnel field lens 510 and the double lenticular 520 permits the light field 125 produced by the light field projector 110 to be enlarged, while straightening the views, shrinking each pixel, and increasing the field of view.

Figure 7:
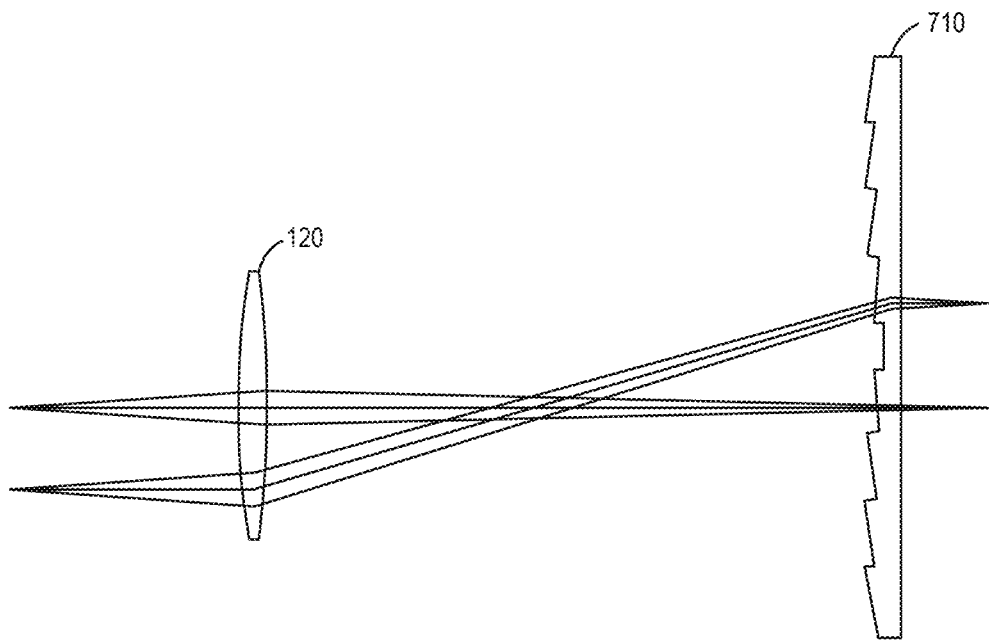
FIG. 7 illustrates projection screens, according to alternative embodiments.
Figure 7:
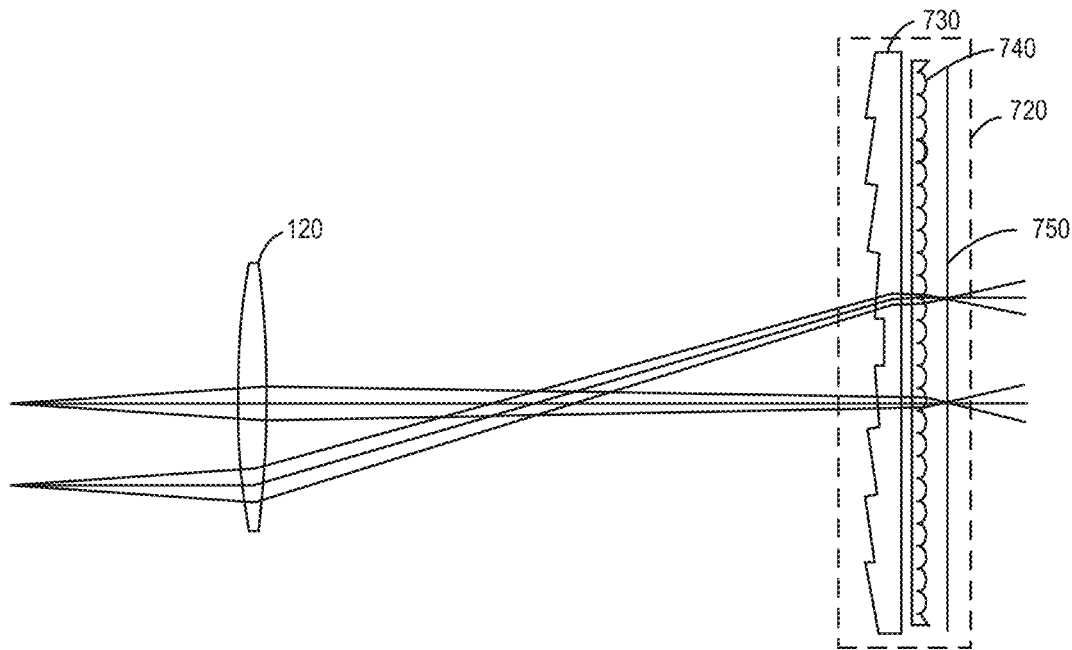

FIG. 7 illustrates projection screens according to alternative embodiments. As shown in panel A, a Fresnel field lens is used as a projection screen 710. Similar to the projection screen 410 described above with respect to FIG. 4, the Fresnel field lens projection screen 710 straightens skewed views produced by the projection lens 120 so that viewers can view a light field by standing directly in front of the projection screen 700, as opposed to at an angle. In contrast to the projection screen 410, the projection screen 710 is not placed at a focal plane (the screen plane) of light that is output by the projection lens 120.

As shown in panel B, an angle-expanding screen 720 includes a Fresnel field lens 730 and a single lenticular 740, which is a single fly-eye array of lenses as opposed to the double lenticular 520 described above with respect to the angle-expanding projection screen 500. Similar to the Fresnel field lens 710, the Fresnel field lens 730 straightens skewed views produced by the projection lens 120 but is not at a focal plane of light output by the projection lens 120. In turn, the single lenticular 740 focuses the straightened cones of light produced by the Fresnel field lens 730 to increase the field of view. In one embodiment, the Fresnel field lens 730 and the single lenticular 740 may be molded into a single piece, with the Fresnel field lens 730 on one side and lenticular bumps on the back. This is simpler in construction than the double lenticular 520 and the Fresnel field lens 510, which may not be molded into a single piece. For horizontal parallax only displays, there may also be an anisotropic (vertical) diffuser 750 after (or before) the single lenticular 740, so that horizontal views are not deflected, but allow viewers to see the horizontal views at different viewing heights.

Rather than pairs of lenses, such as those in the double lenticular 520, that interact with each other to magnify the field of view, the lenses in the single lenticular 740 interact with the projection lens 120 to magnify the field of view. However, the single lenticular 740 requires input light in the form of points rather than pixels having substantial area, as the edges of such pixels would not leave the single lenticular facing forward, unlike the middle of such pixels. In one embodiment, the microlens array 114 described above may be used to create points allowing the single lenticular 740 to be used along with the projection lens 120 to increase the field of view. As described, the microlens array 114 takes as input a collimated beam of light and creates from the collimated beam points of light. In such a case, the microlens array 114 not only diffuses light so that pixels in each row in the DMD 113 interact with all pixels in a corresponding row in the DMD 116, but the microlens array 114 also creates the point sources necessary for the single lenticular 740 to be used with the projection lens 120 to magnify the field of view.

Figure 8:
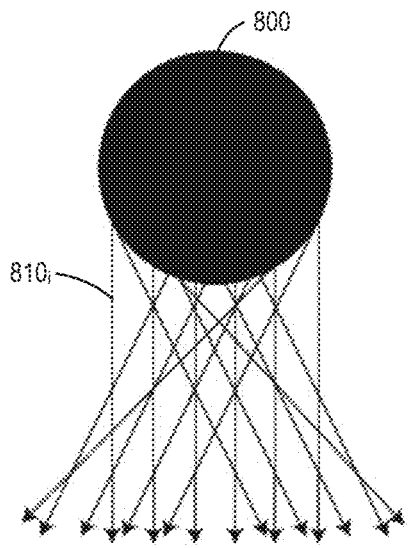
FIG. 8 illustrates recreating an exemplary light field using dual light modulators, according to an embodiment.
Figure 8:
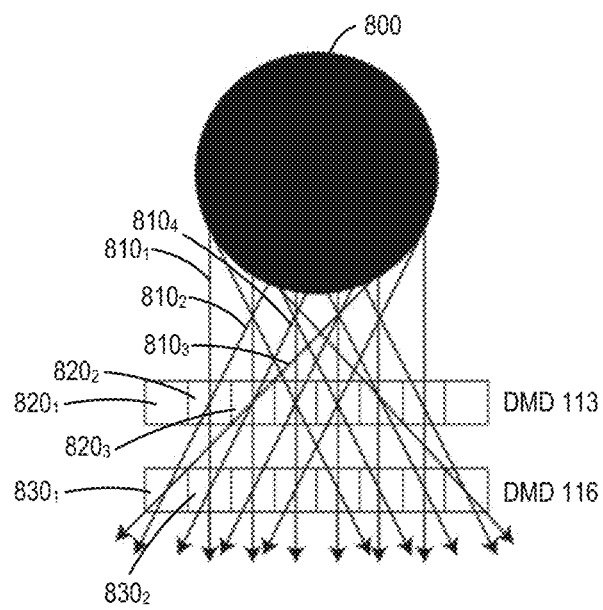
Figure 8:
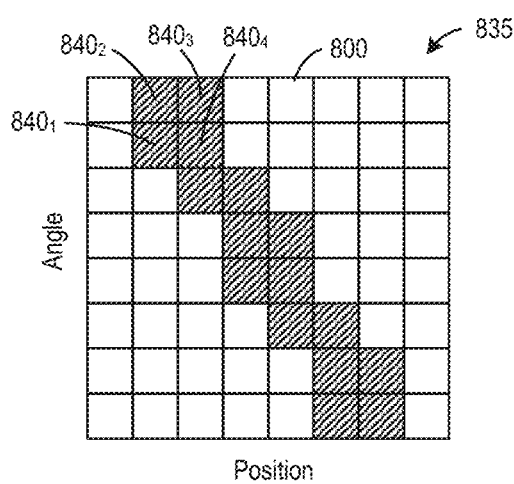

FIG. 8 illustrates recreating an exemplary light field using dual light modulators, according to an embodiment. Panel A shows light rays $810_i$, which may be light rays from light source(s) (not shown) in a scene that are reflected by an object, shown as a sphere 800, and are visible to a viewer in front of the sphere 800.

As shown in panel B, the pair of DMDs 113 and 116 may be used to recreate the light rays $810_i$, including their intensities and directions, thereby permitting viewers in front of the DMDs 113 and 116 to "see" the sphere 800 as if it were behind the DMDs 113 and 116. As described, the DMD 113 encodes position information and the DMD 116 encodes angle information in one embodiment. In an alternative embodiment, one DMD may be used to encode one pixel position on the plane of a DMD and another pixel position may be encoded on the plane of another DMD. Illustratively, light rays $810_1$, $810_2$, $810_3$, $810_4$ travel between the two planes of the DMDs 113 and 116 as follows. The light ray $810_1$ passes through a second pixel position $820_2$, which is encoded by a corresponding mirror of the DMD 113, and a second angle $830_2$, which is encoded by a corresponding mirror of the DMD 116. The light ray $810_2$ passes through the second pixel position $820_2$ and a first angle $830_1$. The light ray $810_3$ passes through a third pixel position $820_2$ and the first angle $830_1$. And the light ray $810_4$ passes through the third pixel position $820_2$ and the second angle $830_2$.

Panel C shows a 2D grid 835 plotting the distribution of positions and angles associated with the light rays $810_i$. Different positions are plotted along the x-axis and different angles are plotted along the y-axis of the grid 835. As shown, cells $840_1$, $840_2$, $840_3$, $840_4$ in the grid 835 correspond to the light rays $810_1$, $810_2$, $810_3$, $810_4$, respectively, that are described above.

Figure 9:
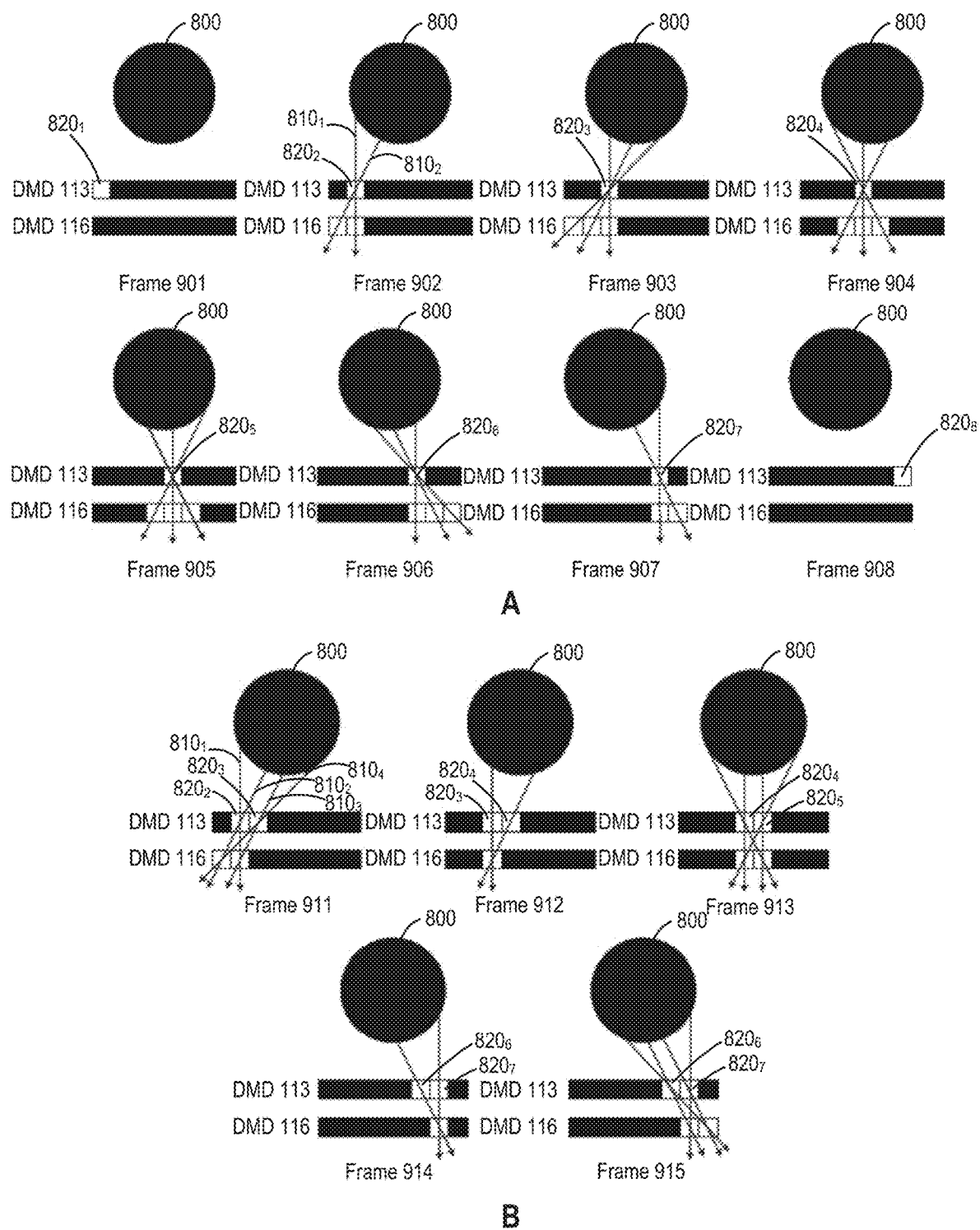
FIG. 9 illustrates an example of the difference between a scanned aperture approach and a compressive approach for creating a light field according to an embodiment.

FIG. 9 illustrates an example of the difference between a scanned aperture approach and a compressive approach for creating a light field, according to an embodiment. One approach for reproducing the light field described above including the light rays $810_i$, referred to herein as the "scanned aperture," involves iteratively controlling the light intensity for each pixel position encoded by the DMD 113 and the corresponding angles encoded by the DMD 116. As shown in panel A, the scanned aperture approach cycles through pixel positions and switches the appropriate mirrors in the DMDs 113 and 116 to recreate light rays that pass through each of the pixel positions $820_{1-8}$ encoded by the DMD 113 (and any angles that those rays pass through that are encoded by the DMD 116) sequentially, requiring eight frames 901-908 to recreate all of the light rays $810_i$ reflected by the sphere 800. For example, in the frame 901, a mirror in the DMD 113 encoding the first pixel position $820_1$ is controlled to reflect light incident thereon, while the other mirrors (in the same rows) in the DMD 113 and the DMD 116 are controlled to dump light incident thereon, producing no light rays visible to a viewer; in the frame 902, a mirror in the DMD 113 encoding the second pixel position $820_2$ is controlled to reflect light incident thereon, other mirrors (in the same row) in the DMD 113 are controlled to dump light incident thereon, and two mirrors in the DMD 116 encoding respective angles are controlled to reflect light incident thereon (while other mirrors in the same row in the DMD 116 are controlled to dump light incident thereon), producing the light rays $810_1$ and $810_2$; etc. It should be understood that, as the frames 901-908 are associated with different light rays, the frames 901-908 will show different portions of an image of the sphere 800. Such frames 901-908, which are also referred to herein as "subframes," add up to the entire light field.

The scanned aperture approach may be used to recreate the light rays $810_i$ with the appropriate positions, angles, and intensities. However, doing so may require generating and displaying a large number of subframes, which can take a long time and/or result in a dim image. For example, 3000 views for an image may require 3000 subframes, which would take 60 seconds to display on a 50 frame per second display device. Panel B illustrates an approach for generating a compressed light field according to an embodiment, that is more efficient than the scanned aperture approach. As shown, the compressive light field approach requires only five frames 911-915 to recreate the light rays $810_i$ reflected by the sphere 800, as opposed to the eight frames 901-908 required by the scanned aperture approach. The compressive light field approach takes advantage of the fact that neighboring views tend to be similar, such that multiple views can be projected simultaneously rather than projecting single views sequentially, by allowing light rays that pass through multiple pixel positions $820_{1-8}$ that are encoded by the DMD 113 to be recreated at the same time. For example, the light rays $810_{1-2}$ that pass through the first pixel position $820_1$ encoded by the DMD 113 and the light rays $810_{3-4}$ that pass through the second angle $830_2$ encoded by the DMD 116 each pass through two of the same angles encoded by the DMD 116. Rather than generating the light rays $810_{1-4}$ in different frames, such as the frames 902 and 903 of the scanned aperture described above, the illustrated compressive light field approach generates the light rays $810_{1-4}$ in a single frame 911 by controlling the appropriate mirrors in the DMDs 113 and 116 (corresponding to the pixel positions $820_{2-3}$ and the first two angles) to reflect light and other mirrors (in the same rows) in the DMDs 113 and 116 to dump light.

Figure 10:
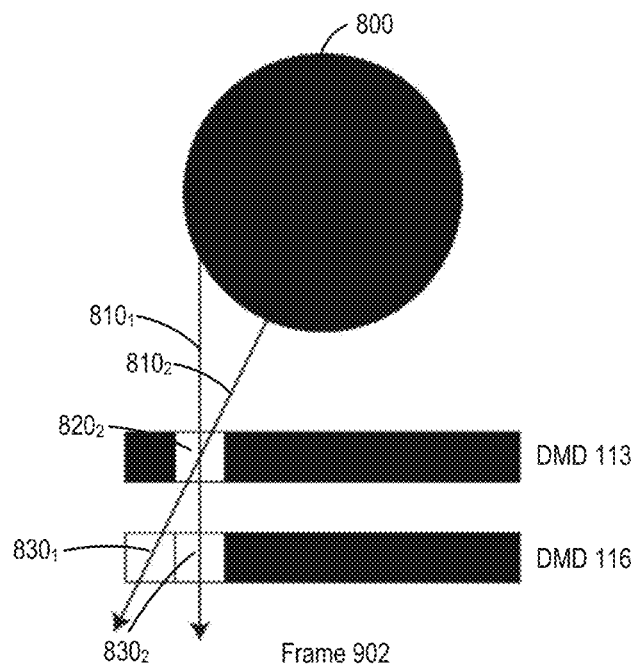
FIG. 10 illustrates in greater detail how two of the frames shown in FIG. 9 are generated, according to an embodiment.
Figure 10:
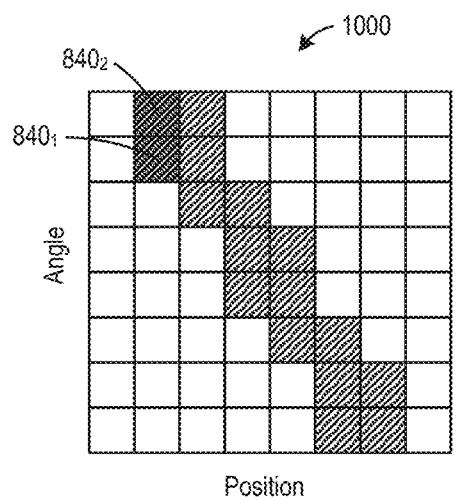
Figure 10:
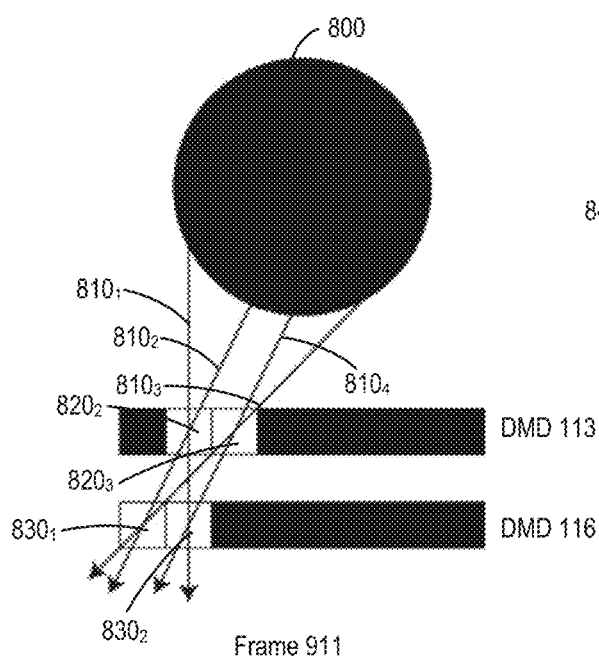
Figure 10:
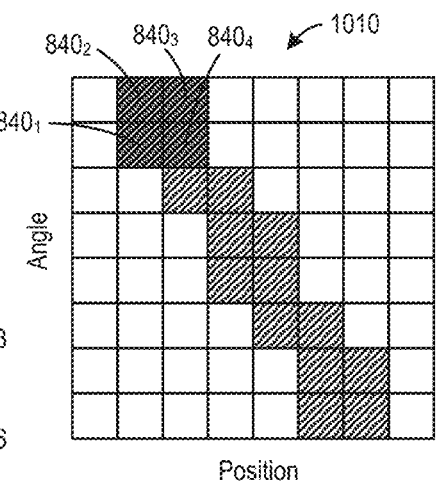

FIG. 10 illustrates in greater detail how the frames 902 and 911 shown in FIG. 9 are generated, according to an embodiment. As shown in panel A, light rays $810_1$ and $810_2$ for the frame 902 are generated using the scanned aperture approach by controlling a mirror in the DMD 113 corresponding to the pixel position $820_2$, as well as mirrors in the DMD 116 corresponding to the angles $830_1$ and $830_2$, to reflect light incident thereon. At the same time, other mirrors (in the same rows) in the DMDs 113 and 116 are controlled to dump light incident thereon. Panel B shows a 2D grid 1000 plotting the distribution of positions and angles associated with the light rays $810_i$, as well as the positions and angles corresponding to the light rays $810_1$ and $810_2$ that are generated for the frame 902, shown as the highlighted cells $840_1$ and $840_2$.

As shown in panel C, light rays $810_1$, $810_2$, $810_3$, and $810_4$ are generated for the frame 911 using the compressive light field approach according to an embodiment, by controlling mirrors in the DMD 113 corresponding to the pixel positions $820_2$ and $820_3$ and mirrors in the DMD 116 corresponding to the angles $830_1$ and $830_2$ to reflect light incident thereon, while controlling other mirrors (in the same rows) in the DMDs 113 and 116 to dump light incident thereon. Panel D shows a 2D grid 1010 plotting the distribution of positions and angles associated with the light rays $810_i$, as well as the positions and angles corresponding to the light rays $810_1$, $810_2$, $810_3$, and $810_4$ that are generated for the frame 911, shown as the highlighted cells $840_1$, $840_2$, $840_3$, and $840_4$. As shown, light rays passing through more positions and angles may be generated at the same time for a frame using the compressive light field approach than using the scanned aperture approach. Experience has shown that the compressive light field approach can reduce the number of frames required to represent a light field by one or two orders of magnitude (or more) over the scanned aperture approach. The amount of compression possible may generally depend on the nature of the scene. For example, natural scenes, in which views tend to be similar as a result of coherent, solid objects occupying definitive locations in space, may be more compressible than scenes depicting dust or sparks.

Figure 11:
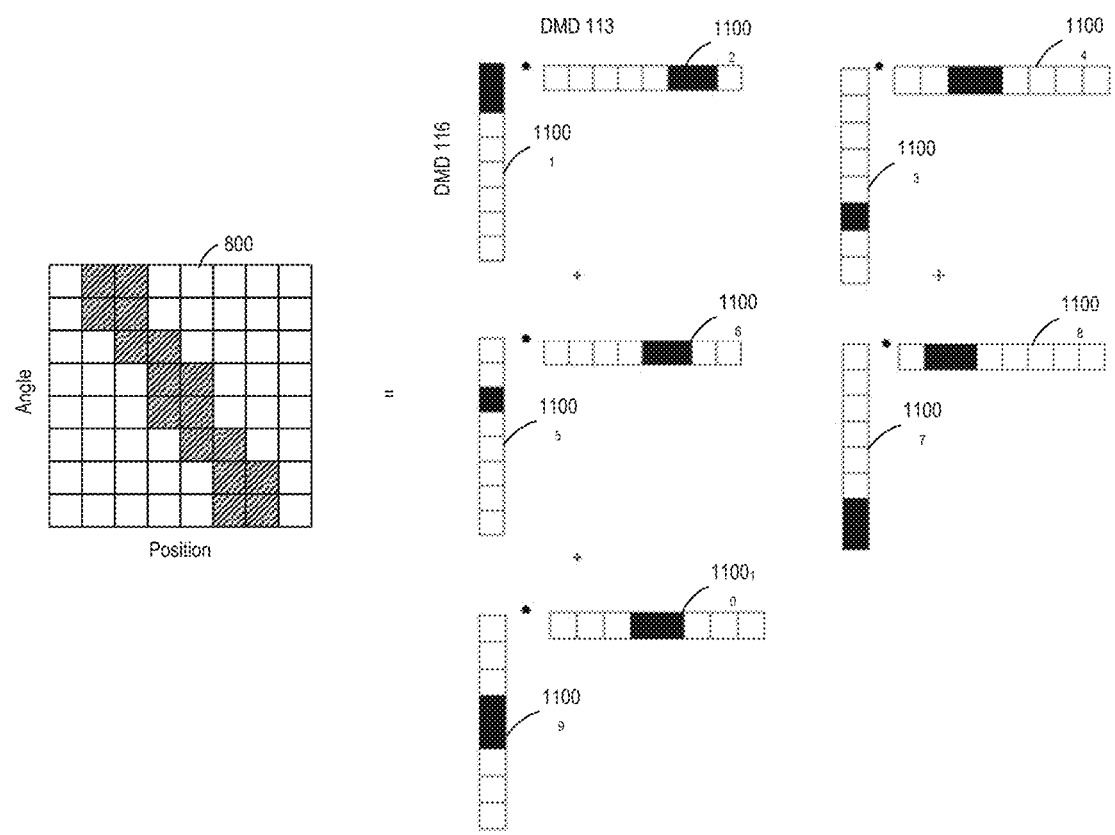
FIG. 11 illustrates an example binary matrix factorization of different luminance bit planes, according to an embodiment.

FIG. 11 illustrates an example binary matrix factorization of different luminance bit planes, according to an embodiment. As shown, an example light field including the light rays $810_i$, which as described can be plotted as the grid 800, may be split into a number of patterns $1100_2$, $1100_4$, $1100_6$, $1100_8$, and $1100_{10}$ to be encoded by the DMD 113 and patterns $1100_1$, $1100_3$, $1100_5$, $1100_7$, and $1100_9$ to be encoded by the DMD 116. The pairs of patterns $1100_1$ and $1100_2$, $1100_3$ and $1100_4$, $1100_5$ and $1100_6$, $1100_7$ and $1100_8$, and $1100_9$ and $1100_{10}$ may be placed in turn on the DMDs 113 and 116, respectively, to generate light rays for subframes of an image frame depicting the sphere 800. In terms of matrix operations, the pattern on a row of the DMD 113 may be represented as a vector, the pattern on a corresponding row of the DMD 116 may be represented by another vector, and the outer product of such vectors is a matrix representing the positions versus angles of a light field (for one row, which is a horizontal line) produced from the interactions of (one pixel row of) the DMD 113 with (a corresponding pixel row) of the DMD 116. That is, for horizontal parallax only displays, each row (horizontal line) is done independently of other rows (horizontal lines), with each pixel in a row of a modulator interacting with every pixel in a corresponding modulator's row. Multiple matrix patterns, one for each row of the modulator (horizontal line), may be placed on the DMDs 113 and 116 that add together to produce the light rays $810_i$ of the light field shown in FIG. 8. Compressing a desired light field into more patterns generally permits more accurate reproduction of the original distribution of the light field. Conversely, compressing into fewer patterns, also referred to as a "lower rank," generally produces less accurate results.

The mirrors of the DMDs 113 and 116 are binary and can be controlled to reflect light incident thereon or dump such light, rather than producing grayscale light as an LCD is able to. Further, light can only be added together and not subtracted (absent interference). In one embodiment, the compressive light field rendering application 150 may determine patterns to be encoded by the DMDs 113 and 116 (such as the patterns $1100_{1-10}$) using non-negative binary matrix factorization, which produces non-negative (as light cannot be subtracted) patterns with binary values (as DMDs are binary). Prior to performing non-negative binary matrix factorization, the compressive light field rendering application 150 may first break a desired grayscale light field into binary patterns, and then factor each of the binary patterns using non-negative binary matrix factorization. In one embodiment, the compressive light field rendering application 150 may split a desired grayscale light field into patterns that represent different luminance (i.e., brightness) bit planes, such as bit planes that are each half as bright (i.e., a bit plane representing one-half brightness, a bit plane representing one-quarter brightness, a bit plane representing one-eighth brightness, etc.) as a more significant bit plane. For example, the grayscale may include 256 levels of grays, corresponding to different luminosity values, and three sets of grayscale patterns may be used to generate red, green, and blue light fields (with light sources emitting red, green, and blue light, respectively) for a color image. In such a case, the compressive light field rendering application 150 may break a grayscale light field into quantized bit planes representing 128, 64, 32, 16, 8, 4, 2, and 1 in the 256 levels of gray, and then perform non-negative binary matrix factorization for each of those bit planes.

As a simplified example, assume the intensities, positions, and angles of a (row of a) grayscale light field are represented by the matrix:

$$\begin{bmatrix} 0 & 0 & 1 & 4 \\ 0 & 6 & 0 & 7 \\ 1 & 3 & 0 & 1 \\ 1 & 0 & 5 & 1 \end{bmatrix}.$$

This matrix can be divided into luminance bit planes for 4 times, 2 times, and 1 times brightness as follows:

$$\begin{bmatrix} 0 & 0 & 1 & 4 \\ 0 & 6 & 0 & 7 \\ 1 & 2 & 0 & 1 \\ 1 & 0 & 5 & 1 \end{bmatrix} = 4 \times \begin{bmatrix} 0 & 0 & 0 & 1 \\ 0 & 1 & 0 & 1 \\ 0 & 0 & 0 & 0 \\ 0 & 0 & 1 & 0 \end{bmatrix} + 2 \times \begin{bmatrix} 0 & 0 & 0 & 0 \\ 0 & 1 & 0 & 1 \\ 0 & 1 & 0 & 0 \\ 0 & 0 & 0 & 0 \end{bmatrix} + \begin{bmatrix} 0 & 0 & 1 & 0 \\ 0 & 0 & 0 & 1 \\ 1 & 0 & 0 & 1 \\ 1 & 0 & 1 & 1 \end{bmatrix}.$$

Then, the three luminance bit planes can be factorized using non-negative binary matrix factorization as follows:

$$\begin{bmatrix} 0 & 0 & 0 & 1 \\ 0 & 1 & 0 & 1 \\ 0 & 0 & 0 & 0 \\ 0 & 0 & 1 & 0 \end{bmatrix} = \begin{bmatrix} 0 \\ 1 \\ 0 \\ 0 \end{bmatrix} [0\ 1\ 0\ 0] + \begin{bmatrix} 0 \\ 0 \\ 0 \\ 1 \end{bmatrix} [0\ 0\ 1\ 0] + \begin{bmatrix} 1 \\ 1 \\ 0 \\ 0 \end{bmatrix} [0\ 0\ 0\ 1]$$

$$\begin{bmatrix} 0 & 0 & 0 & 0 \\ 0 & 1 & 0 & 1 \\ 0 & 1 & 0 & 0 \\ 0 & 0 & 0 & 0 \end{bmatrix} = \begin{bmatrix} 0 \\ 1 \\ 1 \\ 0 \end{bmatrix} [0\ 1\ 0\ 0] + \begin{bmatrix} 0 \\ 1 \\ 0 \\ 0 \end{bmatrix} [0\ 0\ 0\ 1] + \begin{bmatrix} 0 \\ 0 \\ 0 \\ 0 \end{bmatrix} [0\ 0\ 0\ 0]$$

$$\begin{bmatrix} 0 & 0 & 1 & 0 \\ 0 & 0 & 0 & 1 \\ 1 & 0 & 0 & 1 \\ 1 & 0 & 1 & 1 \end{bmatrix} = \begin{bmatrix} 0 \\ 0 \\ 1 \\ 1 \end{bmatrix} [1\ 0\ 0\ 1] + \begin{bmatrix} 0 \\ 1 \\ 0 \\ 0 \end{bmatrix} [0\ 0\ 0\ 1] + \begin{bmatrix} 1 \\ 0 \\ 0 \\ 1 \end{bmatrix} [0\ 0\ 1\ 0]$$

Having obtained such a factorization, the compressive light field rendering application 150 may recreate the original light field by controlling the light source 111 to emit light at 4 times brightness while controlling the DMD 113 based on the [0 1 0 0] pattern and the DMD 116 based on the $$\begin{bmatrix} 0 \\ 1 \\ 0 \\ 0 \end{bmatrix}$$

pattern, then controlling the DMD 113 based on the [0 0 1 0] pattern and the DMD 116 based on the $$\begin{bmatrix} 0 \\ 0 \\ 0 \\ 1 \end{bmatrix}$$

pattern, and then controlling the DMD 113 based on the [0 0 0 1] pattern and the DMD 116 based on the $$\begin{bmatrix} 1 \\ 1 \\ 0 \\ 0 \end{bmatrix}$$

pattern. Thereafter, the compressive light field rendering application 150 may control the light source 111 to emit light at 2 times brightness while controlling the DMD 113 based on the [0 1 0 0] pattern and the DMD 116 based on the $$\begin{bmatrix} 0 \\ 1 \\ 1 \\ 0 \end{bmatrix}$$

pattern, then controlling the DMD 113 based on the [0 0 0 1] pattern and the DMD 116 based on the $$\begin{bmatrix} 0 \\ 0 \\ 0 \\ 1 \end{bmatrix}$$

pattern, and so forth.

In one embodiment, the compressive light field rendering application 150 may further move errors from brighter to less bright bit planes. Errors may be introduced by the compression process. Moving errors from brighter to less bright bit planes solves the problem that errors appearing in brighter bit planes, such as the most bright bit plane (also referred to as the "most significant" bit plane), may be noticeable to a viewer. For example, the compressive light field rendering application 150 may transform an error that appears in one brightness bit plane into two patterns on a next lower brightness bit plane (assuming the next lower brightness bit plane is half as bright), where the two patterns may appear as noise that is less noticeable than the error in the brighter bit plane. Further, the compressive light field rendering application 150 may identify the errors themselves by, e.g., recreating the light field using the existing patterns and comparing the recreated light field to the original light field to determine differences (e.g., missing or added bits) that are errors.

In other embodiments, the compressive light field rendering application 150 may perform a nonlinear dynamic programming search or a gradient descent with binary thresholds or, in lieu of splitting a grayscale light field into different luminance bit planes and performing non-negative binary matrix factorization for each of the bit planes, to compress grayscale light fields. For example, given a number of variables that can either be 0 or 1, such as the vectors representing the DMD patterns described above, a nonlinear dynamic programming search can be used to identify a combination of vectors that is closest to a matrix representing the desired light field after the vectors are multiplied and added together. In a particular embodiment, dynamic programming with backtracking may be used to determine whether assigning a 0 or 1 to binary values in a sequence reduces the reconstruction error, using constraints on the light field to perform an efficient depth first search. That is, the algorithm discussed above uses binary non-negative matrix factorization on each binary bit plane of the (24-bit) color light field to produce the necessary time-multiplexed patterns displayed on the two DMD modulators. The factorization could alternatively be used to factor a non-binary (0-255) matrix into patterns with quantized values representing the intensity of each of the image's brightness bit-planes. This may involve a search using a cost function with quantized weights (representing quantized bit-plane brightness) on sets of binary factors (representing each bit plane pattern), such that the sum of the differences in the desired and factorized pixel brightness is minimized. In other words, instead of factorization, a search may be performed. With a search, the illumination would still vary by 1×, 2×, 4×, etc., and only binary pixel patterns (one for each modulator row) are allowed, which the search should account for by, e.g., using a constrained search (with integer or binary values only, or by using continuous values and then thresholding to binary values). Further, the cost function that is used may be the sum of the differences in desired brightness and the brightness from the factorization.

In a further embodiment, the compressive light field rendering application 150 may perform a genetic algorithm, in lieu of splitting a grayscale light field into different luminance bit planes and performing non-negative binary matrix factorization or performing a nonlinear dynamic programming search or gradient descent with binary thresholds, in order to compress grayscale light fields. In such a case, the compressive light field rendering application 150 may begin with a number of different random samples of vectors representing DMD patterns in a population, determine which sample vectors, after any appropriate multiplying and adding together of the vectors, are able to produce a light field that is closest to the desired light field. The compressive light field rendering application 150 may then select the best samples, split and mix the samples like genetic material, determine which of the split and mixed samples are better and worse, and repeat this process such that sections that are strong and result in light fields close to the desired light field reproduce while weak sections disappear.

In yet another embodiment, a lower color depth, such as 15-bit colors instead of 24-bit colors, may be used to reduce the frame rate and the depth, thereby decreasing the number of views needed to reproduce a light field. For example, 24-bit color requires 8 bits for each of the red, green, and blue channels, whereas high color (15 bit) requires five bits for the red and blue channels and six bits for the green channel.

In another embodiment, a coarser microlens array may be used in lieu of the microlens array 114. Each microlens in the microlens array 114 corresponds to a pixel of the DMD 113, but larger microlenses may be used instead in some embodiments. In such a case, another lens may be required to scale up the pixels to match the microlens array, or a diffuser with a relatively small diffusion angle may be used. This is because it may be difficult to match the pixel pitch of the modulator with the lenslet pitch, so these pitches may be optically match instead by, e.g., using a beam expander to double the diameter of the light beam to fit a lenslet with twice the pitch of the DMD.

Figure 12:
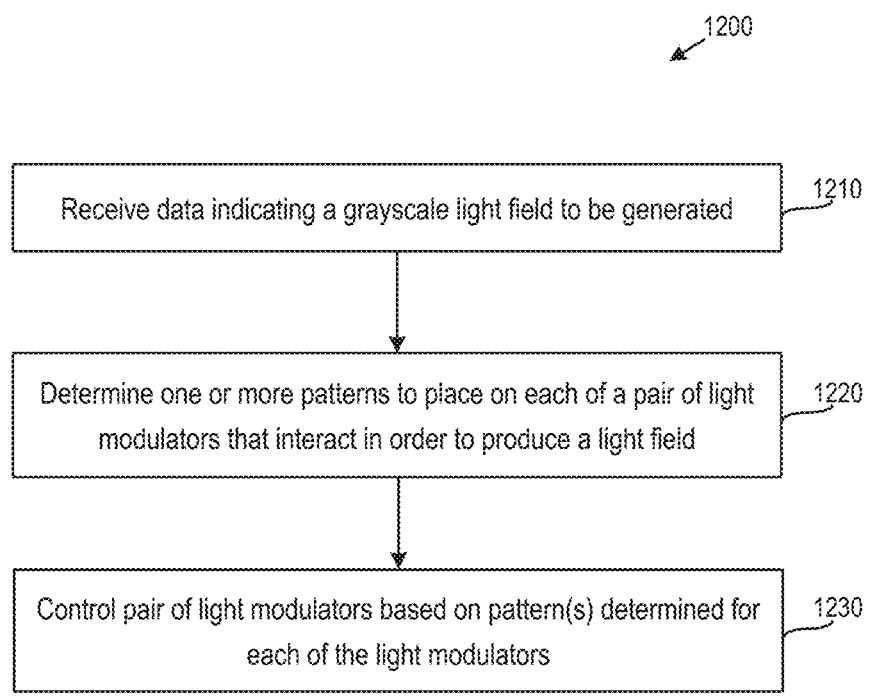
FIG. 12 illustrates a method for controlling dual light modulators to generate a light field, according to an embodiment.

FIG. 12 illustrates a method 1200 for controlling dual light modulators to generate a light field, according to an embodiment. The light field that the method 1200 generates may correspond to one row of light with horizontal-only parallax (having three dimensions, two for position and one for angle), in which case the steps of the method 1200 may be repeated to generate the other rows of the light field. Further, the method 1200 may be repeated to generate light fields in different colors (using different colored light sources), such as red, green, and blue light fields. The light fields in different colors may either be combined (using a combiner block such as a dichroic prism), or sequenced through, to produce color imagery. In addition, the method 1200 may be repeated to generate light fields for the rows of other 3D images, such as the image frames of a video.

As shown, the method 1200 begins at step 1210, where the compressive light field rendering application 150 receives data indicating a grayscale light field to be generated.

Figure 2B:
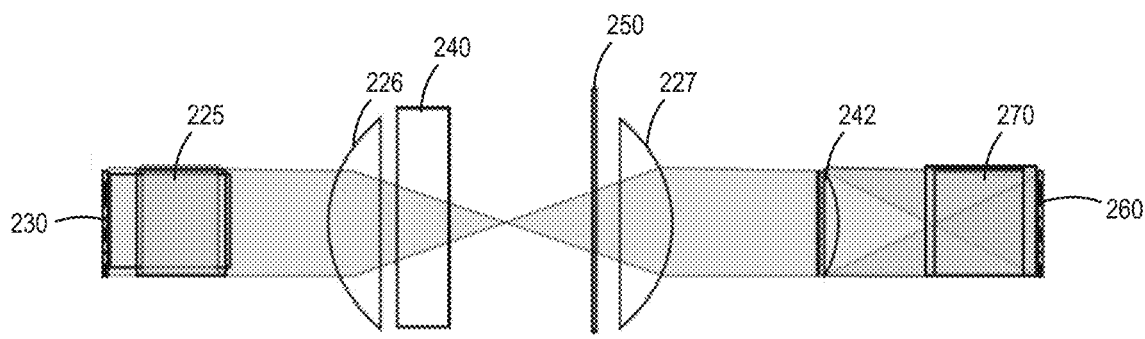

At step 1220, the compressive light field rendering application 150 determines one or more patterns to place on each of a pair of light modulators that interact in order to produce a light field. In one embodiment, the pair of light modulators may be DMDs such as the DMDs 113 and 116 described above with respect to FIGS. 1-2. In some embodiments, the patterns for the light modulators that the compressive light field rendering application 150 determines may include compressive light field patterns that, e.g., allow light rays passing through multiple pixel positions of a DMD to be recreated at the same time, as discussed above with respect to FIGS. 9-11. In some embodiments, the compression of a grayscale light field may include splitting the light field into different luminance bit planes and performing non-negative binary matrix factorization for each of the bit planes, compressing the light field using a nonlinear dynamic programming search, compressing the light field using gradient descent with binary thresholds, or compressing the light field using a genetic algorithm, among other things.

At step 1230, the compressive light field rendering application 150 controls the pair of light modulators (and potentially a light source) based on the pattern(s) determined for each of the light modulators. In the case of DMDs such as the DMDs 113 and 116, the compressive light field rendering application 150 may transmit one or more signals to control mirrors in the DMDs to reflect or dump light incident thereon according to the determined pattern(s). As described, the interactions of mirrors in a row of DMD mirrors associated with pixel positions with mirrors in a row of mirrors associated with angles in another DMD may produce light rays of a light field that are viewable from certain positions and angles, creating the illusion of 3D objects that can be viewed by a viewer from different angles in front of a screen onto which the light field is projected. In addition, the compressive light field rendering application 150 may transmit one or more control signals to control the emitted light intensity of a light source if, e.g., a grayscale light field is split into different luminance bit planes. In embodiments, the light field output by the pair of light modulators may be de-skewed and enlarged using a projection lens, and the light projected by the projection lens may further be straightened and have its field of view increased using an angle-expanding screen, as described above with respect to FIGS. 2 and 4-7.

Figure 13:
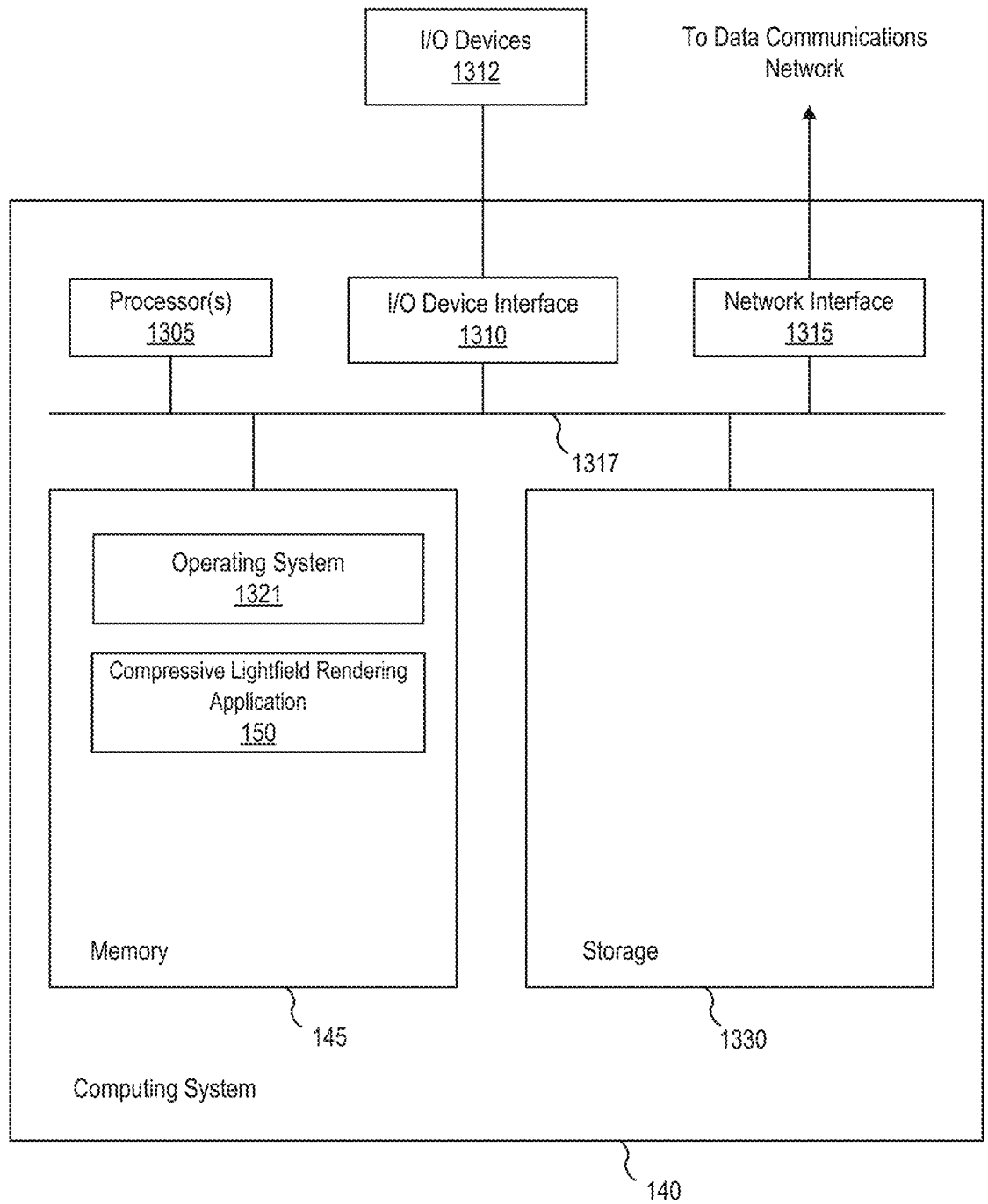
FIG. 13 illustrates in greater detail a computing system in which embodiments of a compressive light field rendering application may be executed.

FIG. 13 illustrates in greater detail the computing system 140 in which embodiments of the compressive light field rendering application 150 may be executed. As shown, the system 1300 includes, without limitation, processor(s) 1305, a network interface 1315 connecting the system to a network 1316, an interconnect 1317, memory 145, and storage 1330. The system 1300 also includes an I/O device interface 1310 connecting I/O devices 1312 (e.g., keyboard, display and mouse devices) to the system 1300.

The processor(s) 1305 retrieve and execute programming instructions, which may be stored in the memory 145. Similarly, the processor(s) 1305 store and retrieve application data which may reside in the memory 145. The interconnect 1317 facilitates transmission, such as of programming instructions and application data, between the processor(s) 1305, I/O device interface 1310, storage 1330, network interface 1315, and memory 145. The processor(s) 1305 are included to be representative of a single central processing unit (CPU), multiple CPUs, a single CPU having multiple processing cores, one or more graphics processing units (GPUs), a combination of such processors, and the like. And the memory 145 is generally included to be representative of a random access memory. The storage 1330 may be a disk drive storage device. Although shown as a single unit, the storage 1330 may be a combination of fixed and/or removable storage devices, such as magnetic disk drives, flash drives, removable memory cards or optical storage, network attached storage (NAS), or a storage area-network (SAN). Further, the system 1300 is included to be representative of a physical computing system as well as virtual machine instances hosted on a set of underlying physical computing systems. Further still, although shown as a single computing system, one of ordinary skill in the art will recognized that the components of the system 1300 shown in FIG. 13 may be distributed across multiple computing systems connected by a data communications network.

As shown, the memory 145 includes an operating system 1321 and the compressive light field rendering application 150. The operating system 1321 may be, e.g., Linux® or Windows®. The compressive light field rendering application 150 is configured to determine patterns for and control dual light modulators to generate light fields. In one embodiment, the compressive light field rendering application 150 may receive data indicating a grayscale light field to be generated, determine one or more patterns to place on each of a pair of light modulators that interact in order to produce a light field, and control the pair of light modulators (and potentially also the intensity of a light source) based on the pattern(s) determined for each of the light modulators, according to the method 1200 described above with respect to FIG. 12.

Although described herein primarily with respect to horizontal-only parallax, embodiments may also provide full parallax by using, e.g., a microlens array that includes full spherical lenses rather than cylindrical lenses and a Fresnel lens along with wide eyes rather than a Fresnel lens along with a lenticular.

Advantageously, embodiments disclosed herein provide light field projection systems capable of producing faster, brighter, deeper, and/or larger light fields, with more views, than traditional light field projection techniques. Experience has shown that a light field projector using dual DMDs, according to a particular embodiment, may be the equivalent of 2000 traditional projectors, producing 2000 views over 90° that give±8 feet of depth of high-definition imagery. Further, experience has shown that light field projection systems according to another particular embodiment can create a deep 3D wall, at 170" diagonal, with enough views over 90-120° to create 12'-16' of depth at full high definition (HD) resolution (and blurred/anti-aliased or with reduced resolution beyond that). Such an autostereo multiview wall may be used to create a relatively large, deep, and high-resolution world with room for virtual characters to move and live in and share space and interact with users, allowing individual users to make eye contact and have personal interactions with fully dimensional virtual characters and multiple users to freely view and explore a scene and virtual characters therein in their own way. A deep 3D wall may also be used as, e.g., a large 3D vista window. In addition, the light field project systems disclosed herein may be used to implement displays in other form factors, such as tabletops and cylindrical 360° displays. Further, compressive techniques are disclosed that reduce the bandwidth (number of frames and patterns) required to produce dense light fields, making a light field projection system more practical. High-speed binary modulators, such as DMDs, may also be used to provide more patterns to create more complex light fields for deeper scenes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects in the flowchart and block diagrams in the Figures may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Herein, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

While the foregoing is directed to embodiments of the present invention, other and further embodiments of the invention may be devised without departing from the basic scope thereof, and the scope thereof is determined by the claims that follow.

What is claimed is:

1. A light field projector, comprising:
a light source configured to emit light; and
an optical arrangement comprising:
 a first digital micromirror device (DMD), the first DMD being controlled to reflect light incident on the first DMD based, at least in part, on a first pattern,
 a second DMD, the second DMD being controlled to reflect light that has been reflected by the first DMD and is incident on the second DMD based, at least in part, on a second pattern,
 a field lens, and
 a diffuser disposed between the first and the second DMDs and comprising a microlens array including either cylindrical lenses or full spherical lenses, wherein the field lens is arranged to deflect light produced by sides of the microlens array inward, wherein, when diffusing the light, reflected light from each pixel in a row of the first DMD passes through the microlens array and the field lens to be horizontally diffused and distributed to every pixel in a corresponding row of the second DMD.

2. The light field projector of claim 1, wherein the diffuser is a holographic one-dimensional (1D) diffuser.

3. The light field projector of claim 1, further comprising, a shift-tilt lens assembly configured to reimage a skewed depth plane of the light reflected by the second DMD onto a flat focal plane.

4. The light field projector of claim 3, further comprising, a projection lens configured to project light output by the shift-tilt lens assembly onto a screen.

5. The light field projector of claim 3, wherein the shift-tilt lens assembly includes a pair of lenses.

6. The light field projector of claim 1, further comprising, a total internal reflecting prism configured to reflect the light emitted by the light source onto the first DMD at an angle.

7. The light field projector of claim 1, further comprising:
one or more relay optics disposed between the first and second DMDs,
wherein the light source includes a plurality of fiber-coupled laser diodes.

8. The light field projector of claim 1, wherein the emitted light is collimated laser light.

9. A light field projector, comprising:
a light source configured to emit light; and
an optical arrangement comprising:
 a first digital micromirror device (DMD), the first DMD being controlled to reflect light incident on the first DMD based, at least in part, on a first pattern,
 a second DMD, the second DMD being controlled to reflect light that has been reflected by the first DMD and is incident on the second DMD based, at least in part, on a second pattern, and
 a diffuser disposed between the first and the second DMDs, wherein, when diffusing the light, reflected light from each pixel in a row of the first DMD passes through the diffuser to be diffused and distributed to every pixel in a corresponding row of the second DMD.

10. The light field projector of claim 9, wherein:
the diffuser is a microlens array including either cylindrical lenses or full spherical lenses; and
the light field projector further includes a field lens used to deflect light produced by sides of the microlens array inward.

11. The light field projector of claim 9, wherein the diffuser is a holographic one-dimensional (1D) diffuser.

12. The light field projector of claim 9, further comprising, a shift-tilt lens assembly configured to reimage a skewed depth plane of the light reflected by the second DMD onto a flat focal plane.

13. The light field projector of claim 12, further comprising, a projection lens configured to project light output by the shift-tilt lens assembly onto a screen.

14. The light field projector of claim 12, wherein the shift-tilt lens assembly includes a pair of lenses.

15. The light field projector of claim 9, further comprising, a total internal reflecting prism configured to reflect the light emitted by the light source onto the first DMD at an angle.

16. The light field projector of claim 9, further comprising:
- one or more relay optics disposed between the first and second DMDs,
- wherein the light source includes a plurality of fiber-coupled laser diodes.

17. An apparatus, comprising:
- a first digital micromirror device (DMD), the first DMD being controlled to reflect light incident on the first DMD based, at least in part, on a first pattern,
- a second DMD, the second DMD being controlled to reflect light that has been reflected by the first DMD and is incident on the second DMD based, at least in part, on a second pattern, and
- a diffuser disposed between the first and the second DMDs, wherein, when diffusing the light, reflected light from each pixel in a row of the first DMD passes through the diffuser to be diffused and distributed to every pixel in a corresponding row of the second DMD.

18. The apparatus of claim 17, wherein:
- the diffuser is a microlens array including either cylindrical lenses or full spherical lenses; and
- the apparatus further includes a field lens used to deflect light produced by sides of the microlens array inward.

19. The apparatus of claim 17, wherein the diffuser is a holographic one-dimensional (1D) diffuser.

20. The apparatus of claim 17, further comprising, a shift-tilt lens assembly configured to reimage a skewed depth plane of the light reflected by the second DMD onto a flat focal plane.

* * * * *